United States Patent
Shin et al.

(10) Patent No.: US 11,850,913 B2
(45) Date of Patent: Dec. 26, 2023

(54) AIR CONDITIONING SYSTEM FOR VEHICLE

(71) Applicants: Hyundai Motor Company, Seoul (KR); Kia Motors Corporation, Seoul (KR)

(72) Inventors: Gee Young Shin, Gyeonggi-do (KR); Seung Sik Han, Gyeonggi-do (KR); Dong Ho Kwon, Gyeonggi-do (KR); Myung Hoe Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 176 days.

(21) Appl. No.: 17/015,756

(22) Filed: Sep. 9, 2020

(65) Prior Publication Data
US 2021/0323374 A1   Oct. 21, 2021

(30) Foreign Application Priority Data
Apr. 17, 2020   (KR) .................. 10-2020-0046855

(51) Int. Cl.
*B60H 1/00*   (2006.01)

(52) U.S. Cl.
CPC ..... *B60H 1/00564* (2013.01); *B60H 1/00021* (2013.01); *B60H 1/00328* (2013.01); *B60H 1/00664* (2013.01); *B60H 1/00807* (2013.01); *B60H 1/00842* (2013.01); *B60H 2001/00092* (2013.01); *B60H 2001/00721* (2013.01)

(58) Field of Classification Search
CPC ............ B60H 1/00564; B60H 1/00021; B60H 1/00328; B60H 1/00664; B60H 1/00807; B60H 1/00842; B60H 2001/00092; B60H 2001/00721
USPC ........................................................ 454/152
See application file for complete search history.

(56) References Cited

U.S. PATENT DOCUMENTS

| | | | | |
|---|---|---|---|---|
| 4,460,036 A | * | 7/1984 | Yoshimi | B60H 1/00842 165/203 |
| 6,199,388 B1 | * | 3/2001 | Fischer, Jr. | F24D 5/04 62/271 |
| 2014/0216684 A1 | * | 8/2014 | Goenka | B60H 1/00499 165/59 |
| 2016/0288609 A1 | * | 10/2016 | Yamaoka | B60H 1/00021 |
| 2017/0166031 A1 | * | 6/2017 | Shin | B60H 1/00921 |

(Continued)

FOREIGN PATENT DOCUMENTS

KR   2018-0038728 A   4/2018

*Primary Examiner* — Allen R. B. Schult
*Assistant Examiner* — William C Weinert
(74) *Attorney, Agent, or Firm* — Fox Rothschild LLP

(57) ABSTRACT

A vehicle air conditioning system is provided and includes a heating duct through which internal air and external air are introduced and a cooling duct through which internal air and external air are introduced. A condenser is disposed in the heating duct and an evaporator is disposed in the cooling duct and is connected to the condenser. A phase change material (PCM) stores thermal energy of the internal air passing through the heating and cooling ducts. An internal/external air door controls the mixing of the internal/external air introduced into the heating and cooling ducts, and a PMC door controls the external air introduced through the heating and cooling ducts whether to pass through the PCM.

14 Claims, 6 Drawing Sheets

(56) References Cited

U.S. PATENT DOCUMENTS

| | | | | |
|---|---|---|---|---|
| 2017/0167776 A1* | 6/2017 | Shin | ..................... | F25B 13/00 |
| 2018/0001732 A1* | 1/2018 | Shin | ................. | B60H 1/00842 |
| 2018/0009287 A1* | 1/2018 | Shin | ................. | B60H 1/00899 |
| 2019/0217680 A1* | 7/2019 | Liu | ................... | B60H 1/00492 |
| 2020/0173445 A1* | 6/2020 | Kono | .................. | F04D 27/003 |

* cited by examiner

AIR CONDITIONING SYSTEM FOR VEHICLE

CROSS REFERENCE TO RELATED APPLICATION

The present application claims priority to Korean Patent Application No. 10-2020-0046855, filed Apr. 17, 2020, the entire contents of which is incorporated herein for all purposes by this reference.

BACKGROUND

Field of the Disclosure

The present disclosure relates to an air conditioning system for a vehicle and, more specifically, to an air conditioning system for a vehicle that performs a cooling/heating operation by changing a flow path of air to eliminate refrigerant lines and valves required to implement a heat pump system and reduce the cost and weight of the air conditioning system.

Description of the Related Art

Recently, as environmental pollution has emerged as an important social issue, technical development for eco-friendly vehicles including electric vehicles, hybrid vehicles, and hydrogen electric vehicles has been actively conducted. On the other hand, in the development of electric vehicle technology, it is important to reduce the air conditioning energy to increase the driving distance of the electric vehicle. Accordingly, in recent years, electric vehicles are cultivating unit performance to improve energy efficiency, and utilize heat pump systems to improve heating efficiency. However, as the heat pump system is utilized, the overall system is complex by requiring additional cooling circuits and additional valves.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides an air conditioning system for a vehicle to perform a cooling/heating operation by changing a flow path of air, rather than using a heat pump system, thereby eliminating refrigerant lines and valves required to implement a heat pump system and reducing the cost and weight of the air conditioning system.

In order to achieve the above objective, according to one aspect of the present disclosure, a vehicle air conditioning system may include: a heating duct through which internal air and external air may be introduced; a cooling duct through which internal air and external air may be introduced; a condenser disposed in the heating duct; an evaporator disposed in the cooling duct and connected to the condenser via a refrigerant line; a phase change material (PCM) storing thermal energy of the internal air passing through the heating duct and the cooling duct; an internal/external air door controlling the mixing of the internal air and the external air introduced into the heating and cooling ducts; and a phase change material (PMC) door controlling the external air introduced through the heating and cooling ducts whether to pass through or not the PCM.

The heating duct may include a first internal air duct through which the internal air may be introduced, and a first external air duct through which the external air may be introduced, and the cooling duct may include a second internal air duct through which the internal air may be introduced, and a second external air duct through which the external air may be introduced. The PCM may be disposed on the first and second internal air ducts to store the thermal energy of the internal air passing through the first and second internal air ducts. The internal/external air door may include a first internal/external air door controlling the mixing of the internal air and the external air introduced into the heating duct, and a second internal/external air door controlling the mixing of the internal air and the external air introduced into the cooling duct.

The PCM door may include a first PCM door controlling the external air introduced through the first external air duct whether to pass through the PCM, and a second PCM door controlling the external air introduced through the second external air duct whether to pass through the PCM. The evaporator may be disposed on the rear side of the PCM and the condenser may be disposed on the rear side of the evaporator with respect to an inlet side of the heating duct or the cooling duct, through which the external air is introduced.

The vehicle air conditioning system may further include one or more of: a duct door configured to communicate or separate the heating duct and the cooling duct to or from each other; a first exit door disposed in the heating duct on the rear side of the condenser to control whether the air having passed through the condenser is discharged to the outside or supplied into the vehicle compartment; and a second exit door disposed in the cooling duct on the rear side of the evaporator to control whether the air having passed through the evaporator is discharged to the outside or supplied into the vehicle compartment. The duct door may be disposed between the condenser and the evaporator.

In the heating mode, the vehicle air conditioning system may be configured to: operate the first and second internal/external air doors to allow the internal/external air to flow into the heating duct and the cooling duct; operate the first and second PCM doors to block the external air introduced through the first and second external air ducts from passing through the PCM and to allow the thermal energy of the air passing through the first and second internal air ducts to be stored in the PCM; operate the duct door to separate the cooling duct and the heating duct from each other; and operate the second exit door to allow cold air having passed through the evaporator to be discharged to the outside.

Additionally, in the heating mode, the vehicle air conditioning system may be configured to: compare a checked dew point of the vehicle compartment with vehicle glass temperature; and in response to determining that the temperature difference between the dew point and the vehicle glass temperature is within a predetermined error range, operate the first internal/external air door to allow only the external air to be introduced into the heating duct and operate the first PCM door to allow the external air introduced through the first external air duct to pass through the PCM.

In the cooling mode, the vehicle air conditioning system may be configured to: operate the first and second internal/external air door to allow only the external/internal air to be introduced into the heating duct and the cooling duct 200, respectively; operate the first and second PCM doors to block the external air introduced through the first external air duct from passing through the PCM, and to allow the thermal energy of the air passing through the second internal air duct to be stored in the PCM; operate the duct door to separate the cooling duct and the heating duct from each other; and operate the first exit door to allow the warm air having passed through the condenser to be discharged to the outside. Additionally, in the cooling mode, the vehicle air conditioning system may be configured to: in response to determining that a required cooling load is less than or equal to a preset cooling load, operate the second internal/external air door to allow only the external air to be introduced into the cooling duct through the second external air duct; and operate the second PCM door to allow the external air introduced through the second external air duct to pass through the PCM.

In the dehumidification mode, the vehicle air conditioning system may be configured to: operate the first internal/external air door to allow the internal/external air to be introduced into the heating duct and operate the second internal/external air door to allow only the external air to be introduced into the cooling duct; operate the first and second PCM doors to allow the external air introduced through the first external air duct and block the second external air duct from passing through the PCM, and to allow the thermal energy of the air passing through the first internal air duct to be stored in the PCM; operate the duct door to allow the cooling duct and the heating duct to communicate with each other so that a portion of the cold air having passed through the evaporator is introduced into the heating duct to pass through the condenser; operate the first exit door so that a portion of the warm air having passed through the condenser is discharged to the outside and the rest is supplied to the vehicle compartment; and operate the second exit door so that a portion of the cold air having passed through the evaporator is discharged to the outside and the rest is supplied to the vehicle compartment.

Additionally, in the dehumidification mode, the vehicle air conditioning system may be configured to: compare a checked dew point of the vehicle compartment with vehicle glass temperature; and in response to determining that the temperature difference between the dew point and the vehicle glass temperature is within a predetermined error range, operate the first internal/external air door to allow only the external air to be introduced into the heating duct and operate the first PCM door to allow the external air introduced through the first external air duct to pass through the PCM.

According to the present disclosure, the phase change material may be disposed on the first internal air duct and the second internal air duct to store the thermal energy of the internal air in the phase change material as the internal air in the first internal air duct and the second internal air duct passes through the phase change material, and when the air conditioning mode changes so that only the external air needs to be introduced into the heating duct and the cooling duct through the first and second external air ducts, the external air may be allowed to pass through the phase change material before passing through the condenser or evaporator and thus, the external air may pass through the condenser or the evaporator in a state of having increased or decreased temperature with reception of the thermal energy pre-stored in the phase change material during the passage of the phase change material, thereby preventing the load concentration on the condenser or the evaporator, and thus improving the overall cooling and heating efficiency.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a vehicle air conditioning system according to an exemplary embodiment of the present disclosure will be described with reference to the accompanying drawings.

Figure 1:
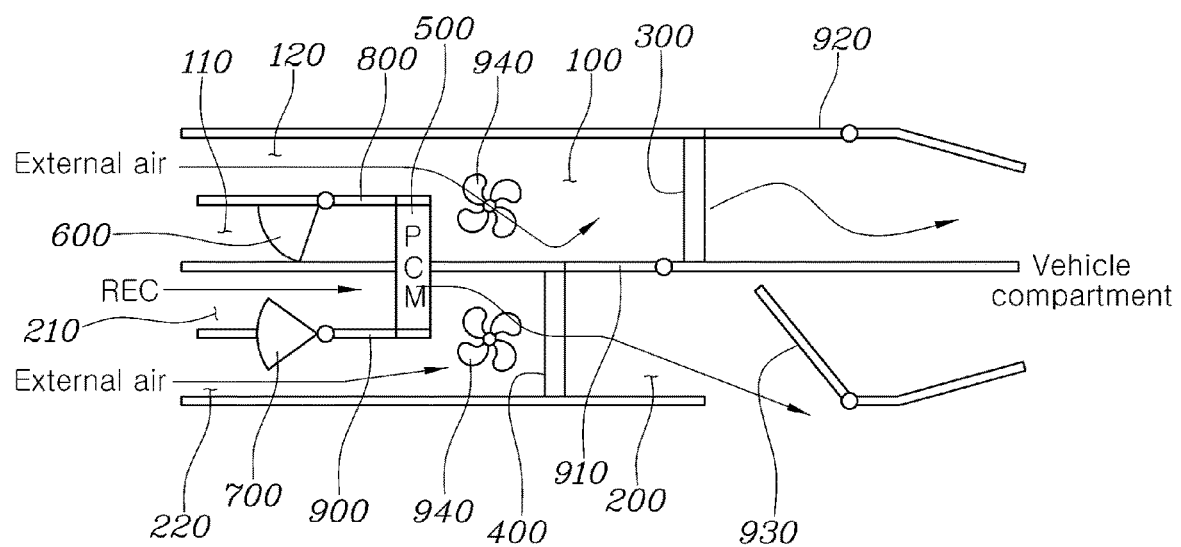
FIG. 1 is a view schematically illustrating the overall configuration of a vehicle air conditioning system for a vehicle according to an exemplary embodiment of the present disclosure.

Referring to FIG. 1, the vehicle air conditioning system according to an exemplary embodiment of the present disclosure may include a heating duct 100, a cooling duct 200, a condenser 300, an evaporator 400, a phase change material (PCM) 500, internal air/external air doors 600 and 700 that control the mixing of the internal air and the external air flowing into the heating duct 100 and the cooling duct 200, and PCM doors 800 and 900 that control the external air introduced into the heating duct 100 and the cooling duct 200 whether to pass through the PCM. The system may further include one or more of a duct door 910, a first exit door 920, and a second exit door 930. Notably, the veracious doors may be operated by a controller of the system mounted within the vehicle.

The heating duct 100 may include a first internal air duct 110 through which the internal air may be introduced, and a first external air duct 120 through which the external air may be introduced. Specifically, the internal air in a vehicle compartment may re-circulate and flow through the first internal air duct 110, the external air around the vehicle may be introduced through the first external air duct 120, and the mixing of the internal air and the external air introduced into the heating duct 100 through the first internal air duct 110 and the first external air duct 120 may be regulated by the first internal/external air door 600.

According to an exemplary embodiment, the internal/external air introduced through the first internal air duct 110 and the first external air duct 120 under the control of the first internal/external air door 600 may be mixed and supplied to the vehicle compartment through the heating duct 100. According to another exemplary embodiment, only one of the internal/external air introduced through the first internal air duct 110 and the first external air duct 120 under the control of the first internal/external air door 600 may be supplied to the vehicle compartment through the heating duct 100.

The cooling duct 200 may include a second internal air duct 210 through which the internal air may be introduced, and a second external air duct 220 through which the external air may be introduced. Specifically, the internal air in a vehicle compartment may re-circulate and flow through the second internal air duct 210, the external air around the vehicle may be introduced through the second external air duct 220, and the mixing of the internal air and the external air introduced into the cooling duct 200 through the second internal air duct 210 and the second external air duct 220 may be regulated by the second internal/external air door 700.

The internal/external air introduced through the second internal air duct 210 and the second external air duct 220 under the control of the second internal/external air door 700 may be mixed and supplied to the vehicle compartment through the cooling duct 200. Additionally, only one of the internal/external air introduced through the second internal air duct 210 and the second external air duct 220 under the control of the second internal/external air door 700 may be supplied to the vehicle compartment through the cooling duct 200.

The condenser 300 may be disposed in the heating duct 100, and the evaporator 400 may be disposed in the cooling duct 200. In particular, the condenser 300 and the evaporator 400 may be connected to each other through a refrigerant line. At this time, the refrigerant line may be a line through which a refrigerant is circulated, and may include a compressor (not shown), the condenser 300, an expansion valve (not shown), and the evaporator 400. Specifically, the refrigerant may be circulated in the order of the compressor, the condenser 300, the expansion valve, and the evaporator 400. When the refrigerant is circulated according to the cooling cycle, the condenser 300 may be continuously maintained in a hot state, and the evaporator 400 may be continuously maintained in a cold state.

In addition, as illustrated in FIG. 1, a blower 940 may be disposed in the heating duct 100 and the cooling duct 200 to allow air in the corresponding ducts to be supplied into the vehicle compartment. The phase change material (PCM) 500 may be disposed on the first internal air duct 110 and the second internal air duct 210 to store the thermal energy passing through the first internal air duct 110 and the second internal air duct 210. According to an exemplary embodiment, under the control of the PMC doors 800 and 900, the external air introduced through the first external air duct 120 and the second external air duct 220 may also pass through the phase change material 500, and in this case, the phase change material 500 may store the thermal energy of the external air passing through the PCM.

The PCM doors 800 and 900 may include a first PCM door 800 and a second PCM door 900. Particularly, the first PCM door 800 may control the external air introduced through the first external air duct 120 whether to pass through the PCM 500. When the first PCM door 800 is closed, the external air introduced through the first external air duct 120 may be blocked from passing through the PCM 500, and when the first PCM door 800 is opened, the external air introduced through the first external air duct 120 may pass through the PCM 500.

The second PCM door 900 may control the external air introduced through the second external air duct 220 whether to pass through the PCM 500. When the second PCM door 900 is closed, the external air introduced through the second external air duct 220 may be blocked from passing through the PCM 500, and when the second PCM door 900 is opened, the external air introduced through the second external air duct 220 may pass through the PCM 500.

Meanwhile, the evaporator 400 may be disposed on the rear side of the phase change material 500 and the condenser 300 may be disposed on the rear side of the evaporator 400 with respect to an inlet side of the heating duct 100 or the cooling duct 200, through which the external air is introduced. The duct door 910 may provide communication between or separate the heating duct 100 and the cooling duct 200 to/from each other. At this time, the duct door 910 may be disposed between the condenser 300 in the heating duct 100 and the evaporator 400 in the cooling duct 200. According to an exemplary embodiment, when the duct door 910 is closed, the heating duct 100 and the cooling duct 200 may be separated from each other, and according to another exemplary embodiment, when the duct door 910 is opened, the heating duct 100 and the cooling duct 200 may be in communication with each other and thus, the cold air having passed through the evaporator 400 may flow into the heating duct 100 through the duct door 910.

As described above, the duct door 910 may be disposed between the condenser 300 in the heating duct 100 and the evaporator 400 in the cooling duct 200 to open the duct door 910 in the dehumidifying mode to allow the air cooled during passage of the evaporator 400 to flow into the heating duct 100 and then the vehicle compartment through the duct door 910, thereby efficiently facilitating the dehumidification of the vehicle compartment. The first exit door 920 may be disposed in the heating duct 100 on the rear side of the condenser 300 to control whether the air having passed through the condenser 300 is discharged to the outside or supplied into the vehicle compartment.

According to an exemplary embodiment, when the first exit door 920 is opened, after passing through the condenser 300, the warm air may be completely discharged to the outside. According to another exemplary embodiment, when the first exit door 920 is closed, after passing through the condenser 300, the warm air may be completely supplied to the vehicle compartment. Further, according to still another exemplary embodiment, when the first exit door 920 is partially closed, after passing through the condenser 300, a portion of the warm air may be discharged to the outside, and a remaining portion may be supplied to the vehicle compartment.

The second exit door 930 may be disposed in the cooling duct 200 on the rear side of the evaporator 400 to control whether the air having passed through the evaporator 400 is discharged to the outside or supplied into the vehicle compartment. According to an exemplary embodiment, when the second exit door 930 is opened, after passing through the evaporator 400, the cold air may be completely discharged to the outside. According to another exemplary embodiment, when the second exit door 930 is closed, after passing through the evaporator 400, the cold air may be completely supplied to the vehicle compartment. Further, according to still another exemplary embodiment, when the second exit door 930 is partially closed, after passing through the evaporator 400, a portion of the cold air may be discharged to the outside, and a remaining portion may be supplied to the vehicle compartment.

On the other hand, although not illustrated in detail in the drawings, the vehicle air conditioning system according to the present disclosure may include an actuator configured to drive a plurality of doors (e.g., the first internal/external air door 600, the second internal/external air door 700, the first PCM door 800, the second PCM door 900, the duct door 910, the first exit door 920, and the second exit door 930), a power supply for the actuator, and a controller configured to operate the actuator according to respective air conditioning modes.

Hereinafter, with reference to FIGS. 2 to 7, the operation of the vehicle air conditioning system according to the present disclosure will be described in detail according to respective air conditioning modes. First, referring to FIG. 2, in the heating mode, the vehicle air conditioning system may control the first internal/external air door 600 and the second internal/external air door 700 to allow the internal/external air to be introduced into the heating duct 100 and the cooling duct 200. Further, the vehicle air conditioning system may control the first PCM door 800 and the second PCM door 900 to allow the external air introduced through the first external air duct 120 and block the second external air duct 220 from passing through the PCM 500, and to allow the thermal energy of the air passing through the first internal air duct 110 and the second internal air duct 210 to be stored in the PCM 500. In addition, the duct door 910 may be controlled to separate the cooling duct 200 and the heating duct 100, and the second exit door 930 may be controlled to discharge the cold air obtained after having passed through the evaporator 400 to the outside.

Figure 2:
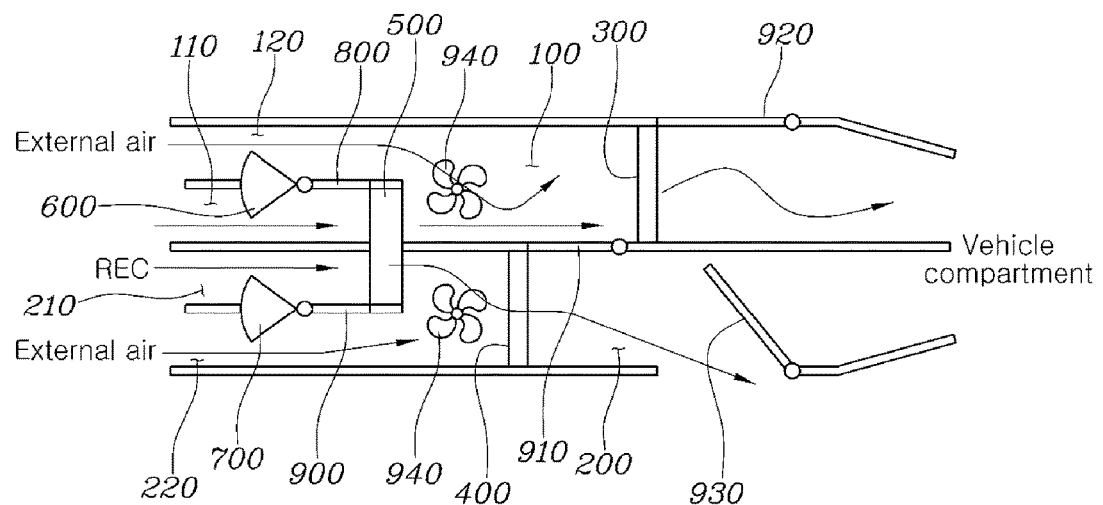
FIG. 2 is a view illustrating the operation of the vehicle air conditioning system in the heating mode according to an exemplary embodiment of the present disclosure.

At this time, the internal air introduced through the first internal air duct 110 and the second internal air duct 210 is warm air that is re-circulated from the vehicle compartment in the heating mode, wherein the thermal energy of the warm internal air may be stored in the PCM 500 while passing through the PCM 500. Meanwhile, FIG. 2 illustrates a state in which the heating is maximally operated, wherein the second exit door 930 is controlled to discharge the cold air obtained during passing through the evaporator 400 to the outside. When it is not necessary to operate the heating at maximum, the second exit door 930 may be controlled to supply a portion of the cold air that has passed through the evaporator 400 to the vehicle compartment.

On the other hand, in the vehicle air conditioning system according to the present disclosure, in the process of heating the vehicle compartment according to the heating mode, the dew point of the vehicle compartment may be checked and compared with the temperature of the vehicle glass to change the operation of the components of the vehicle air conditioning system according to the comparison result. The vehicle air conditioning system may further include a sensor configured to measure the humidity and temperature of the vehicle compartment, and the temperature of the vehicle glass, and check the dew point of the vehicle compartment based on the sensed information, and compare the checked dew point of the vehicle compartment with the temperature of the vehicle glass.

Figure 4:
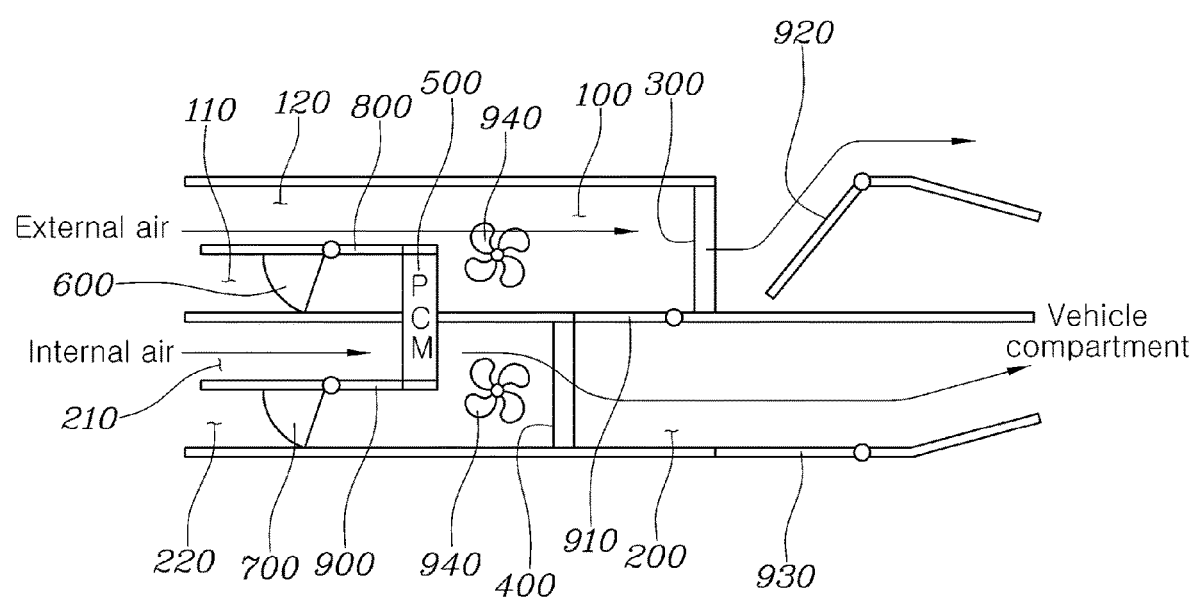
FIG. 4 is a view illustrating the operation of the vehicle air conditioning system in the cooling mode according to an exemplary embodiment of the present disclosure.

Specifically, in the heating mode, the checked dew point of the vehicle compartment may be compared with the vehicle glass temperature, and in response to determining that the temperature difference between the dew point and the vehicle glass temperature is within a predetermined error range, as illustrated in FIG. 4, the first internal/external air door 600 may be controlled so that only the external air is introduced into the heating duct 100, and the first PCM door 800 may be controlled so that the external air introduced through the first external air duct 120 passes through the phase change material 500. In particular, when the checked dew point of the vehicle compartment is compared with the vehicle glass temperature and in response to determining that the difference in temperature between the dew point and the vehicle glass temperature is within a predetermined error range, indicates the state in which the humidity in the vehicle compartment is increased by re-circulating the internal air in the vehicle compartment. In that state, the humidity in the vehicle compartment needs to be regulated by introducing the external air.

Figure 3:
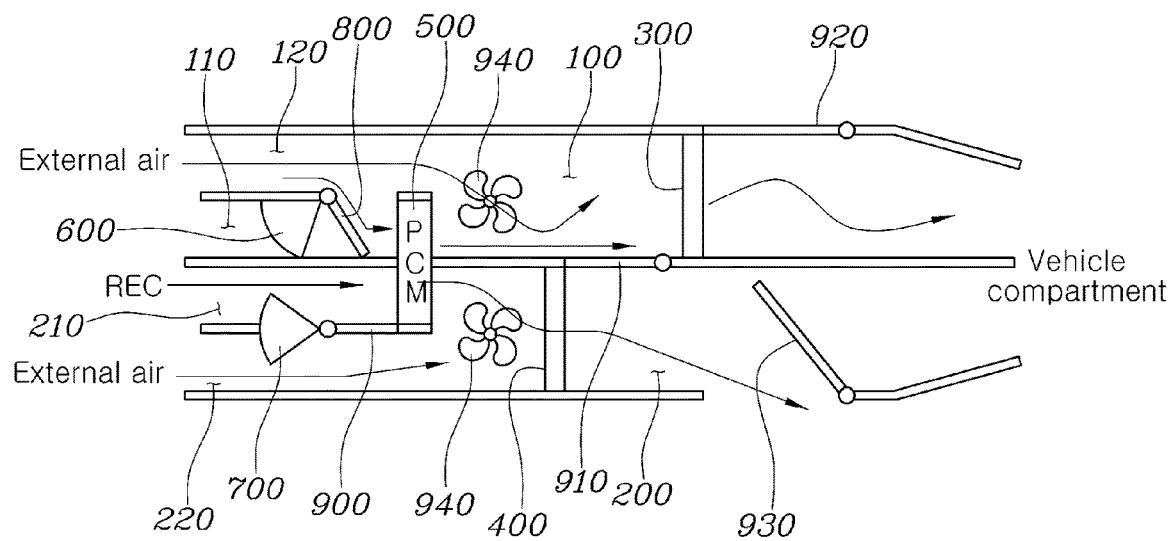
FIG. 3 is a view illustrating the operation of the vehicle air conditioning system when the dew point confirmed in the heating mode is similar to the temperature of the vehicle glass according to an exemplary embodiment of the present disclosure.

At this time, only the external air should be introduced into the heating duct 100 under the control of the first internal/external air door as illustrated in FIG. 3, and thus, the first PCM door may be controlled to allow the external air introduced through the first external air duct 120 to pass through the PCM 500 and receive the thermal energy previously stored in the PCM 500 and to pass through the condenser 300 in a state in which the temperature of the external air is increased, thereby preventing the concentration of the heating load on the condenser 300 and thus improving the overall heating efficiency.

In addition, referring to FIG. 4, in the cooling mode, the vehicle air conditioning system may control the first internal/external air door 600 and the second internal/external air door 700 to allow only the internal/external air to be introduced into the heating duct 100 and the cooling duct 200, respectively. Further, the vehicle air conditioning system may control the first PCM door 800 and the second PCM door 900 to block the external air introduced through the first external air duct 120 from passing through the PCM 500, and to allow the thermal energy of the air passing through the second internal air duct 210 to be stored in the PCM 500.

The duct door 910 may be controlled to separate the cooling duct 200 and the heating duct 100, and the first exit door 920 may be controlled to discharge the warm air obtained after having passed through the condenser 400 to the outside. At this time, the internal air introduced through the second internal air duct 210 is cold air that is re-circulated from the vehicle compartment in the cooling mode, wherein the thermal energy of the cold internal air may be stored in the PCM 500 while passing through the PCM 500.

Meanwhile, FIG. 4 illustrates a state in which the cooling is maximally operated, wherein the first exit door 920 may be controlled to discharge the warm air obtained during passing through the condenser 300 to the outside. On the other hand, in the vehicle air conditioning system according to the present disclosure, in the process of cooling the vehicle compartment according to the cooling mode, the required cooling load of the vehicle compartment may be checked and the operation of the components of the vehicle air conditioning system may be changed according to the cooling load.

Figure 5:
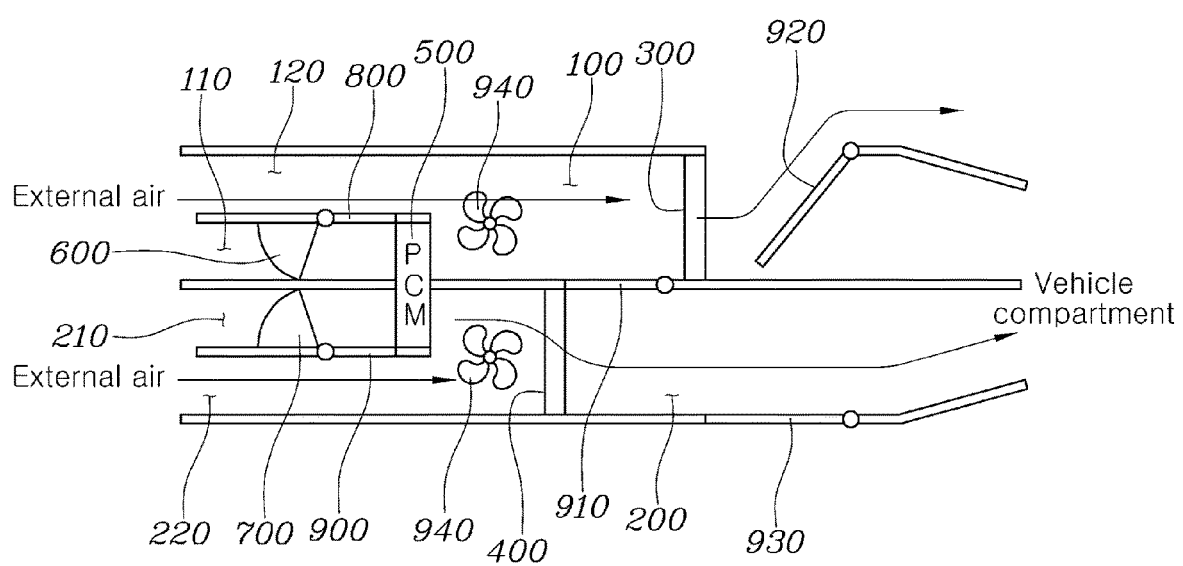
FIG. 5 is a view illustrating the operation of the vehicle air conditioning system when the cooling load required in the cooling mode is equal to or less than a predetermined cooling load according to an exemplary embodiment of the present disclosure.
Figure 6:
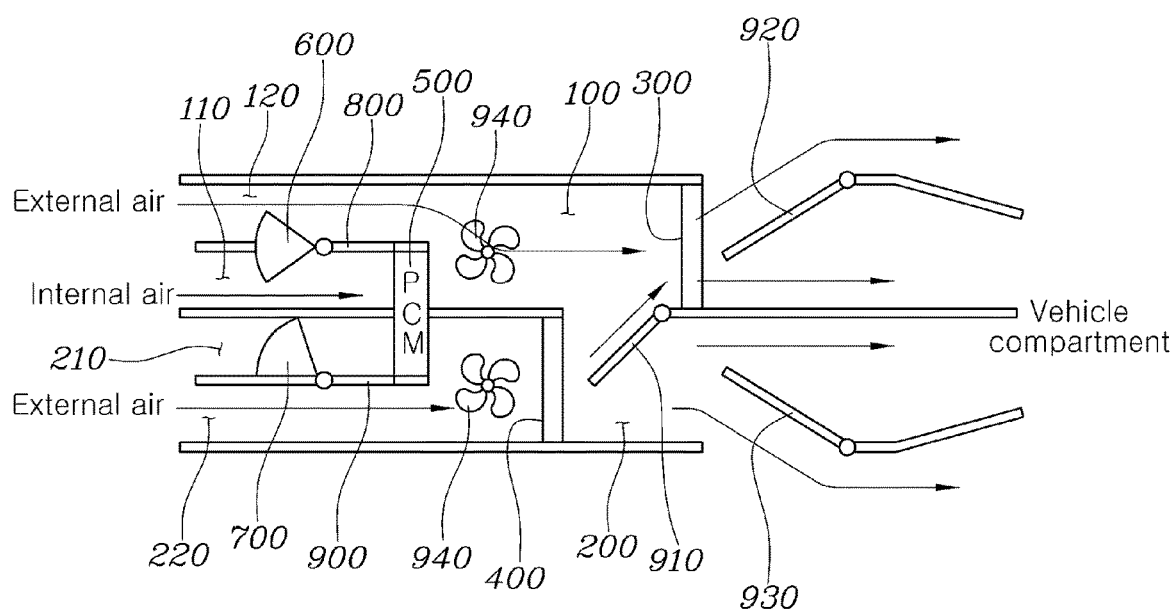
FIG. 6 is a view illustrating the operation of the vehicle air conditioning system in the dehumidification mode according to an exemplary embodiment of the present disclosure.

Specifically, in the cooling mode, when the required cooling load is less than or equal to a preset cooling load, as illustrated in FIG. 5, the second internal/external air door 700 may be controlled to allow only the external air to be introduced into the cooling duct 200 through the second external air duct 220, and the second PCM door 900 may be controlled to allow the external air introduced through the second external air duct 220 to pass through the phase change material 500.

In particular, in response to determining that the required cooling load is equal to or less than a preset cooling load, a mild cooling condition, may be detected rather than a maximum cooling condition. For example, in the maximum cooling condition, the desired temperature of the vehicle compartment may be about 18 degrees, and when the required cooling load is equal to or less than a preset cooling load, the desired temperature of the vehicle compartment may be about 24 degrees.

As described above, when the required cooling load is equal to or less than a preset cooling load, it is necessary to check the required cooling load in the vehicle compartment and change the operation of the components of the vehicle air conditioning system according to the cooling load. As described above, when the required cooling load is equal to or less than a preset cooling load, it is necessary to control the second internal/external air door 700 to allow only the external air to be introduced into the cooling duct 200, and thus, the second PCM door 900 may be controlled to allow the external air introduced through the second external air duct 220 to pass through the PCM 500 and receive the thermal energy previously stored in the PCM 500 and to pass through the evaporator 400 in a state in which the temperature of the external air is decreased, thereby preventing the concentration of the cooling load on the evaporator 400 and thus improving the overall cooling efficiency.

According to the present disclosure, the phase change material 500 may be disposed on the first internal air duct 110 and the second internal air duct 210 to store the thermal energy of the internal air in the phase change material 500 as the internal air in the first internal air duct 110 and the second internal air duct 210 passes through the phase change material 500. When the air conditioning mode changes so that only the external air needs to be introduced into the heating duct 100 and the cooling duct 200 through the first and second external air ducts 120 and 220, the external air is allowed to pass through the phase change material 500 before passing through the condenser 300 or evaporator 400 and thus, the external air may pass through the condenser 300 or the evaporator 400 in a state of having increased or decreased temperature with reception of the thermal energy pre-stored in the phase change material 500 during the passage of the phase change material 500, thereby preventing the load concentration on the condenser 300 or the evaporator 400, and thus improving the overall cooling and heating efficiency.

Meanwhile, referring to FIG. 5, in the dehumidification mode, the vehicle air conditioning system may be configured to control the first internal/external air door 600 to allow the internal/external air to be introduced into the heating duct 100, and control the second internal/external air door 700 to allow only the external air to be introduced into the cooling duct 200. Further, the vehicle air conditioning system may be configured to control the first PCM door 800 and the second PCM door 900 to allow the external air introduced through the first external air duct 120 and block the second external air duct 220 from passing through the PCM 500, and to allow the thermal energy of the air passing through the first internal air duct 110 to be stored in the PCM 500.

In addition, the duct door 910 may be controlled to allow the cooling duct 200 and the heating duct 100 to communicate with each other so that a portion of the cold air having passed through the evaporator 400 may be introduced into the heating duct 100 to pass through the condenser 300. Further, the first exit door 920 may be controlled to discharge a portion of the warm air having passed through the condenser 300 to the outside and to supply a remaining portion to the vehicle compartment, and the second exit door 930 may be controlled to discharge a portion of the cold air having passed through the evaporator 400 to the outside and supply a remaining portion to the vehicle compartment.

Meanwhile, the internal air introduced through the first internal air duct 110 may be warm air that is re-circulated from the vehicle compartment in the heating mode. The thermal energy of the warm internal air may be stored in the PCM 500 while passing through the PCM 500. On the other hand, in the vehicle air conditioning system according to the present disclosure, the dew point of the vehicle compartment may be checked and compared with the temperature of the vehicle glass to change the operation of the components of the vehicle air conditioning system according to the comparison result.

Specifically, in the dehumidification mode, the checked dew point of the vehicle compartment may be compared with the vehicle glass temperature, and in response to determining that the temperature difference between the dew point and the vehicle glass temperature is within a predetermined error range, the first internal/external air door 600 may be controlled so that only the external air is introduced into the heating duct 100, and the first PCM door 800 may be controlled so that the external air introduced through the first external air duct 120 passes through the phase change material 500. In particular, when the checked dew point of the vehicle compartment is compared with the vehicle glass temperature and in response to determining that the difference in temperature between the dew point and the vehicle glass temperature is within a predetermined error range, indicates the state in which the humidity in the vehicle compartment is increased by re-circulating the internal air in the vehicle compartment. In that state, the humidity in the vehicle compartment needs to be regulated by introducing the external air.

Figure 7:
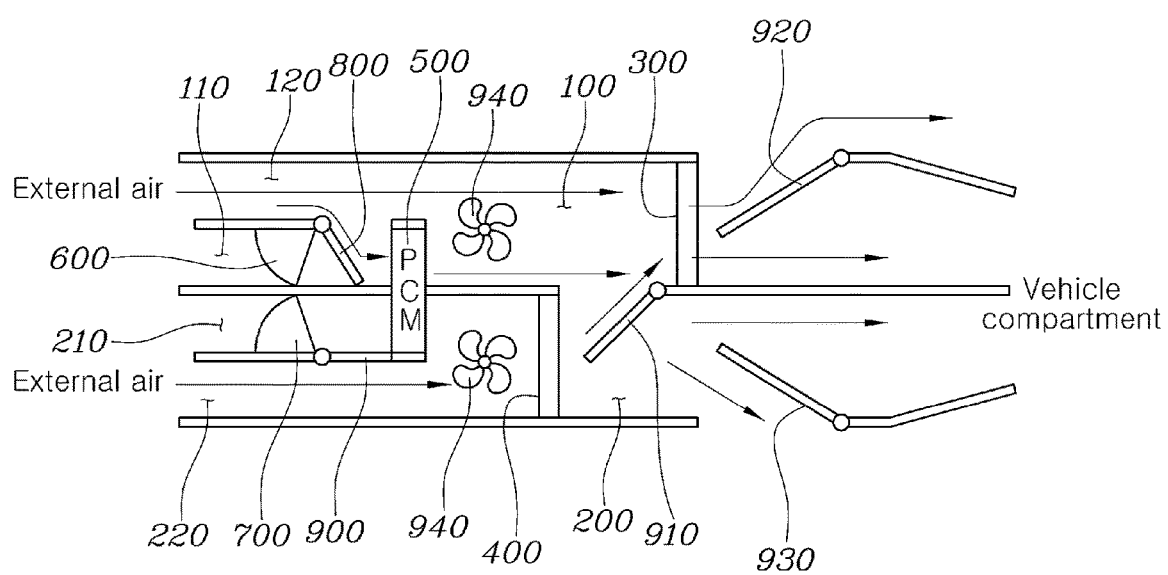
FIG. 7 is a view illustrating the operation of the vehicle air conditioning system when the dew point confirmed in the dehumidification mode is similar to the temperature of the vehicle glass according to an exemplary embodiment of the present disclosure.

At this time, only the external air should be introduced into the heating duct 100 under the control of the first internal/external air door 600 as illustrated in FIG. 7, and thus, the first PCM door 800 may be controlled to allow the external air introduced through the first external air duct 120 to pass through the PCM 500 and receive the thermal energy previously stored in the PCM 500 and to pass through the condenser 300 in a state in which the temperature of the external air is increased, thereby preventing the concentration of the heating load on the condenser 300.

Although the present disclosure has been described and illustrated with respect to the specific exemplary embodiments, those skilled in the art will appreciate that various improvements and modifications are possible, without departing from the scope and spirit of the present disclosure as disclosed in the accompanying claims.

What is claimed is:

1. A vehicle air conditioning system, comprising:
   a heating duct configured to receive internal air and external air;
   a cooling duct configured to receive internal air and external air;
   a condenser disposed in the heating duct;
   an evaporator disposed in the cooling duct and connected to the condenser via a refrigerant line;
   a phase change material (PCM) stored in a housing that is separate from the refrigerant line, wherein the housing is within the heating duct and the cooling duct, and wherein the PCM stores thermal energy of the internal air passing through the heating duct and the cooling duct;
   internal/external air doors configured to open and close so as to control the mixing of the internal air and the external air introduced into the heating and cooling ducts; and
   first and second phase change material (PCM) doors configured to open and close so as to control the external air introduced through the heating and cooling ducts whether to pass through the PCM;
   wherein the first and second PCM doors are disposed between respective internal/external air doors and the PCM.

2. The vehicle air conditioning system of claim 1, wherein the heating duct includes a first internal air duct through which the internal air is introduced, and a first external air duct through which the external air is introduced, and the cooling duct includes a second internal air duct through which the internal air is introduced, and a second external air duct through which the external air is introduced.

3. The vehicle air conditioning system of claim 2, wherein the PCM is disposed within the first and second internal air ducts to store the thermal energy of the internal air passing through the first and second internal air ducts.

4. The vehicle air conditioning system of claim 1, wherein the internal/external air doors include a first internal/external air door controlling the mixing of the internal air and the external air introduced into the heating duct, and a second internal/external air door controlling the mixing of the internal air and the external air introduced into the cooling duct.

5. The vehicle air conditioning system of claim 4, wherein the first PCM door controls the external air introduced through the first external air duct whether to pass through the PCM, and the second PCM door controls the external air introduced through the second external air duct whether to pass through the PCM.

6. The vehicle air conditioning system of claim 1, wherein the evaporator is disposed on a rear side of the PCM and the condenser is disposed on a rear side of the evaporator with respect to an inlet side of the heating duct or the cooling duct, through which the external air is introduced.

7. The vehicle air conditioning system of claim 5, further comprising one or more of:
   a duct door configured to provide communication between or separate the heating duct and the cooling duct to or from each other;
   a first exit door disposed in the heating duct on a rear side of the condenser to control whether the air having passed through the condenser is discharged to the outside or supplied into the vehicle compartment; and
   a second exit door disposed in the cooling duct on a rear side of the evaporator to control whether the air having passed through the evaporator is discharged to the outside or supplied into the vehicle compartment.

8. The vehicle air conditioning system of claim 7, wherein the duct door is disposed between the condenser and the evaporator.

9. The vehicle air conditioning system of claim 7, wherein in a heating mode, the vehicle air conditioning system is configured to:
   control, by a controller, an actuator to drive the first and second internal/external air doors to allow the internal/external air to flow into the heating duct and the cooling duct;
   control, by the controller, an actuator to drive the first and second PCM doors to block the external air introduced through the first and second external air ducts from passing through the PCM and to allow the thermal energy of the air passing through the first and second internal air ducts to be stored in the PCM;
   control, by the controller, an actuator to drive the duct door to separate the cooling duct and the heating duct from each other; and
   control, by the controller, the second exit door to allow cold air having passed through the evaporator to be discharged to the outside.

10. The vehicle air conditioning system of claim 9, wherein in the heating mode, the vehicle air conditioning system is configured to:
    compare a checked dew point of the vehicle compartment with vehicle glass temperature; and
    in response to determining that the temperature difference between the dew point and the vehicle glass temperature is within a predetermined error range, control the first internal/external air door to allow only the external air to be introduced into the heating duct and control the first PCM door to allow the external air introduced through the first external air duct to pass through the PCM.

11. The vehicle air conditioning system of claim 7, wherein in a cooling mode, the vehicle air conditioning system is configured to:
    control the first and second internal/external air door to allow only the external/internal air to be introduced into the heating duct and the cooling duct, respectively;
    control the first and second PCM doors to block the external air introduced through the first external air duct from passing through the PCM, and to allow the thermal energy of the air passing through the second internal air duct to be stored in the PCM;

control the duct door to separate the cooling duct and the heating duct from each other; and control the first exit door to allow the warm air having passed through the condenser to be discharged to the outside.

12. The vehicle air conditioning system of claim 11, wherein in the cooling mode, the vehicle air conditioning system is configured to:

in response to determining that a required cooling load is less than or equal to a preset cooling load, control the second internal/external air door to allow only the external air to be introduced into the cooling duct through the second external air duct; and control the second PCM door to allow the external air introduced through the second external air duct to pass through the PCM.

13. The vehicle air conditioning system of claim 7, wherein in a dehumidification mode, the vehicle air conditioning system is configured to:

control the first internal/external air door to allow the internal/external air to be introduced into the heating duct and control the second internal/external air door to allow only the external air to be introduced into the cooling duct;

control the first and second PCM doors to block the external air introduced through the first external air duct and the second external air duct from passing through the PCM, and to allow the thermal energy of the air passing through the first internal air duct to be stored in the PCM;

control the duct door to allow the cooling duct and the heating duct to communicate with each other to introduce a portion of the cold air having passed through the evaporator into the heating duct to pass through the condenser;

control the first exit door to discharge a portion of the warm air having passed through the condenser to the outside and to supply a remaining portion to the vehicle compartment; and control the second exit door to discharge a portion of the cold air having passed through the evaporator to the outside and to supply a remaining portion to the vehicle compartment.

14. The vehicle air conditioning system of claim 13, wherein in the dehumidification mode, the vehicle air conditioning system is configured to:

compare a checked dew point of the vehicle compartment with vehicle glass temperature; and in response to determining that the temperature difference between the dew point and the vehicle glass temperature is within a predetermined error range, control the first internal/external air door to allow only the external air to be introduced into the heating duct and control the first PCM door to allow the external air introduced through the first external air duct to pass through the PCM.

* * * * *